(12) United States Patent
Bagheri et al.

(10) Patent No.: US 8,694,354 B2
(45) Date of Patent: Apr. 8, 2014

(54) TRANSITION PHASE TROUBLE DETECTION IN SERVICES DELIVERY MANAGEMENT

(75) Inventors: Saeed Bagheri, Croton-on-Hudson, NY (US); Douglas C. Bunch, Richardson, TX (US); Theresa E. Ell, Bronxville, NY (US); Krishna C. Ratakonda, Yorktown Heights, NY (US); Katrina M. Reffett, Greenup, KY (US); Rose M. Williams, Wappinger Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 12/955,475

(22) Filed: Nov. 29, 2010

(65) Prior Publication Data

US 2012/0136694 A1    May 31, 2012

(51) Int. Cl.
*G06Q 10/00* (2012.01)
*G06Q 10/06* (2012.01)
*G06Q 10/10* (2012.01)

(52) U.S. Cl.
CPC ........ *G06Q 10/06313* (2013.01); *G06Q 10/103* (2013.01); *G06Q 10/06393* (2013.01); *G06Q 10/06395* (2013.01); *G06Q 10/0635* (2013.01)
USPC ........ 705/7.23; 705/7.28; 705/301; 705/7.39; 705/7.41

(58) Field of Classification Search
USPC ...................... 705/7.23, 301, 7.39, 7.41, 7.28
See application file for complete search history.

(56) References Cited

U.S. PATENT DOCUMENTS

| | | | |
|---|---|---|---|
| 6,216,108 B1 | 4/2001 | LeVander | |
| 7,949,663 B1 * | 5/2011 | Cassone et al. | 707/750 |
| 8,407,078 B1 * | 3/2013 | Caputo et al. | 705/7.27 |
| 2002/0049621 A1 * | 4/2002 | Bruce | 705/7 |
| 2003/0023470 A1 * | 1/2003 | Labbi | 705/7 |
| 2003/0110124 A1 | 6/2003 | Escher | |
| 2004/0111306 A1 * | 6/2004 | Yokota et al. | 705/7 |
| 2005/0033620 A1 * | 2/2005 | Gloor et al. | 705/7 |
| 2005/0060213 A1 * | 3/2005 | Lavu et al. | 705/7 |
| 2006/0136282 A1 * | 6/2006 | Furin et al. | 705/10 |
| 2007/0157195 A1 * | 7/2007 | Gaa-Frost et al. | 717/174 |
| 2008/0021768 A1 | 1/2008 | Ross | |
| 2009/0240543 A1 * | 9/2009 | Nakamura et al. | 705/7 |

OTHER PUBLICATIONS

Ohsugi, "Is This Cost Estimate Reliable?", 2007, In First International Symposium on Empirical Software Engineering and Measurement, ESEM 2007, pp. 384-392.*

(Continued)

*Primary Examiner* — Justin M Pats
*Assistant Examiner* — Ivan R Goldberg
(74) *Attorney, Agent, or Firm* — John R. Pivnichny; Law Office of Jim Boice

(57) ABSTRACT

A method, system, and/or computer program product predicts trouble during a transition phase of a current project. Past operational data and past trouble data for past healthy projects and past troubled projects before transition phases is collected. A trouble correlation between the past operational data and the past trouble data is then determined. A set of key metrics that describes a current health of a current project before transitioning from a current phase to a future phase is defined, and values of the set of key metrics for the current project are identified. Identified values of the set of key metrics for the current project are compared to the past operational data for past healthy and troubled projects in order to generate a pattern comparison. This pattern comparison, along with the trouble correlation, is used to generate a predicted quality of transition for the current project.

19 Claims, 2 Drawing Sheets

(56) References Cited

OTHER PUBLICATIONS

Abe, "Estimation of Project Success Using Bayesian Classifier," 2006, ICSE '06, pp. 600-603.*

Raphael, "Incremental Development of CBR Strategies for Computing Project Cost Probabilities," 2007, Advanced Engineering Informatics, vol. 21, pp. 311-321.*

Mendes, "Bayesian Network Models for Web Effort Prediction: A Comparative Study," 2008, IEEE Transactions on Software Engineering, vol. 34, pp. 723-737.*

Tosun, "Feature Weighting Heuristics for Analogy-Based Effort Estimation Models," 2009, Expert Systems with Applications, vol. 36, pp. 10325-10333.*

Ratakonda, "Identifying trouble patterns in complex IT services engagements," Mar./Apr. 2010, IBM Journal of Research and Development, vol. 54, No. 2, pp. 1-9.*

Jianyi, "Implementing a Quantitative-Based Methodology for Project Risk Assessment DSS," 2008, Proceedings of the 27th Chinese Control Conference, pp. 730-734.*

J. O. Rawlings, "Applied Regression Analysis" Wadsworth and Books/Cole Advanced Book and Software, Pacific Grove, CA., Chapter 11, pp. 301-322.

* cited by examiner

TRANSITION PHASE TROUBLE DETECTION IN SERVICES DELIVERY MANAGEMENT

BACKGROUND

The present disclosure relates to the field of computers, and specifically to the use of computers to evaluate projects. Still more particularly, the present disclosure relates to the use of computers in predicting how well a current project will transition from one phase to another.

Projects are often divided into different phases, such that there is a transition from one phase to another. Such transitions may involve the addition of various resources (human, hardware, software, etc.), which may or may not be available at the needed levels or at particular times. If a transition is too problematic, then the project may need to be abandoned, or at least modified, in order to make it practical.

BRIEF SUMMARY

A method, system, and/or computer program product predicts trouble during a transition phase of a current project. Past operational data and past trouble data for past healthy projects and past troubled projects before transition phases is collected. A trouble correlation between the past operational data and the past trouble data is then determined. A set of key metrics that describes a current health of a current project before transitioning from a current phase to a future phase is defined, and values of the set of key metrics for the current project are identified. Identified values of the set of key metrics for the current project are compared to the past operational data for past healthy and troubled projects in order to generate a pattern comparison. This pattern comparison, along with the trouble correlation, is used to generate a predicted quality of transition for the current project.

DETAILED DESCRIPTION

Figure 1:
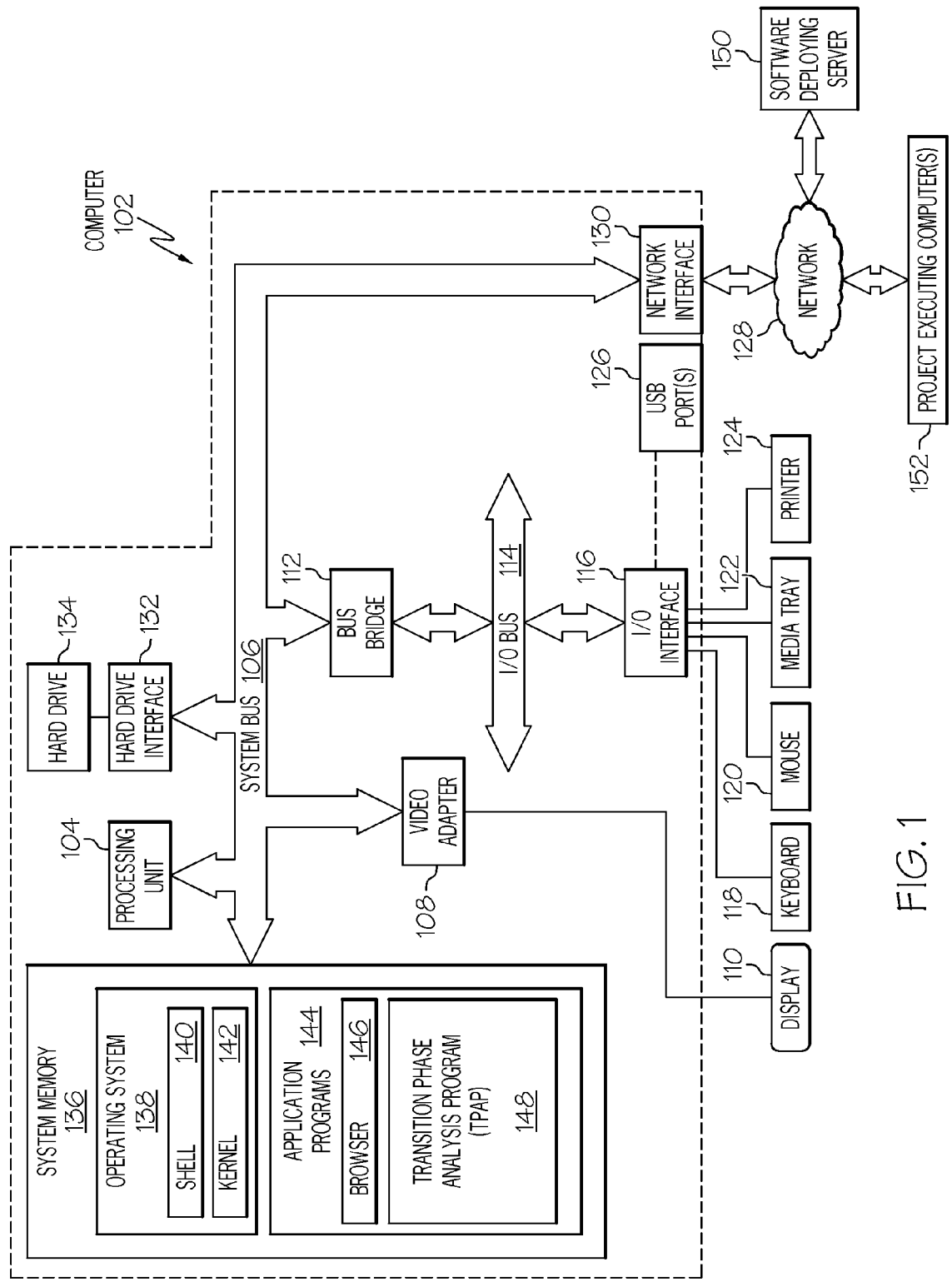
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In one embodiment of the present disclosure, a project undergoes many delivery management reviews (at different levels) in its life cycle. The breadth, level and frequency of such reviews depend, in large part, on the project's financial performance. For example, a project with solid performance and above expectation return may have very few reviews in its life cycle, but a project with consistent negative gross profit may experience continuous scrutiny from various management levels.

A major challenge in delivery management is allocating the management effort to various projects and ensuring that the proper delivery management balance is maintained across a portfolio. As a rule of thumb, typically no more than 20% of the projects in a portfolio can undergo delivery management review in a quarter. Therefore, proper selection of projects to review in a quarter is crucial.

In accordance with the present disclosure, one aspect of proper project management is selecting projects to undergo delivery review in order to establish a financial outlook for that project. Thus, the ability to predict the financial status of projects in a portfolio can significantly facilitate the process of effort allocation in delivery management. For instance, knowing the estimated net (or inception-to-date) gross profit for each project in a portfolio in the next three month period (i.e. next quarter) can guide the delivery management effort allocation problem.

Thus, the present disclosure presents a new method for predicting the status of projects within a portfolio during a future transition. In one embodiment, alerts are produced that inform the management of the possibility of transition trouble of a given type for a project under consideration. In doing so, a collection of past data for thousands of projects may be utilized. This data includes both projects' details as well as the actual observed status during the transition.

In accordance with the description provided herein, "x" describes different parameters of projects before there is a transition from one phase to another. The variable "y" describes the quality of the transition, including the cost, speed, customer satisfaction, etc., associated with the transition. For example, assume that a project is transitioning from a small pilot program to a full-fledged program. If the transition runs into unexpected problems (e.g., an unexpected lack of human resources, hardware, software, etc. to go from the small pilot program to the full-fledged program), then that project is deemed a problematic project. Finally, the variable "t" is a measurement of the transition trouble itself, such as the project failing, the customer firing the service provider, a refusal of persons to work on the project after the transition, etc.

Thus, in one embodiment of the present disclosure, $x^p = (x_i^p)$ is defined, where $i=1 \ldots n$ is an n-dimensional vector which holds the value of key parameters for a given project before transition. Here, p is the project index and i is the parameter index. Examples of relevant parameters are revenue and cost from inception until right before transition, project size, initial review rating, customer review rating, etc. Also, $y^p = (y_j^p)$ is defined, where $j=1 \ldots m$ as an m-dimensional vector which holds the value of parameters describing the quality of transition. Examples of relevant parameters are transition period length, transition quality, quality of service after transition, etc. Finally, $t^p = (t_k^p)$ is defined, where $k=1 \ldots l$ as an l-dimensional vector which holds the value of parameters describing the value of different troubles. Usually, the vector t is normalized between zero and one, with zero representing no trouble, and one representing maximum trouble. For past projects, the trouble vector states the observed level of trouble in each of $k=1 \ldots l$ different areas of potential transition problem. For the present projects, the trouble vector represents the expected trouble in each potential area of transition problem, or said differently, the likelihood of a potential transition problem area actually being a trouble area.

In the first part of an algorithm utilized by the present disclosure, a function $f: \mathbb{R} \to \mathbb{R}$ is formed based on the portfolio of projects that are being worked on. This function $f$ calculates the trouble vector from the observed key parameters after the transition, i.e. $t^p = f(y^p)$. For instance, if the quality of the transition is not good ($y_1=1$), then the quality trouble is very close to one ($t_1 \approx 1$).

In the second part of the algorithm utilized by the present disclosure, the value of the quality of transition vector for a given project is estimated based on the key parameter vector for that project, as well as the key parameter and transition quality vector for all past projects. To do so, the non-linear function h is estimated by an optimization based on historical data, depicted below as $\tilde{h}$:

$$\tilde{h} = \operatorname{argmin}\left\{ \sum_{q=}^{Q} \| y^q - h(x^q) \|^2 \right\} \quad \text{Equation (1)}$$

where q is the index of past projects and Q is the total number of past projects under consideration. In one embodiment of the invention, the function $\tilde{h}$ often has the form of a decision tree:

$$h(x) = (h_j(x)) \quad \text{Equation (2)}$$

$$= \left( \| x - \sigma_j \|^2 \prod_{i=1}^{n} U(x_i - \sigma_j^i) \right)$$

where $\sigma_j^i$ for $i=1 \ldots n$ and $j=1 \ldots m$ is the threshold matrix whose value determines the function h, and $\Pi$ is a product sign. That is, Equation (2) looks at different ranges for x, and then assigns a value to y. By repeatedly determining values for h (e.g., answers to a customer satisfaction questionnaire, the speed of transition, etc.) from past projects, $\tilde{h}$ for the current project can thus be estimated. Here $U(x)$ is the unit step function whose value is one when the argument is positive and zero otherwise. Once the function $\tilde{h}$ is known, it is used to estimate the value of the transition quality vector $\tilde{y}^p$ for the project p under consideration:

$$\tilde{y}^p = \tilde{h}(x^p) \quad \text{Equation (3)}$$

Note that $\tilde{y}^p$ is not the actual transition quality vector $y^p$, rather it is its estimate. Then, the next step is to calculate the estimated trouble area for the transition time of project p:

$$\tilde{t}^p = f(\tilde{y}^p) \quad \text{Equation (4)}$$

Finally, the appropriate alerts are produced based on the estimated trouble likelihood for different potential problem areas.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150 and/or project executing computer(s) 152.

Computer 102 includes a processing unit 104 that is coupled to a system bus 106. Processing unit 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a transition phase analysis program (TPAP) 148. TPAP 148 includes code for implementing the processes described below, including those described in FIG. 2. In one embodiment, computer 102 is able to download TPAP 148 from software deploying server 150, including in an on-demand basis, wherein the code in TPAP 148 is not downloaded until needed for execution to define and/or implement the improved enterprise architecture described herein. Note further that, in one embodiment of the present invention, software deploying server 150 performs all of the functions associated with the present invention (including execution of TPAP 148), thus freeing computer 102 from having to use its own internal computing resources to execute TPAP 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
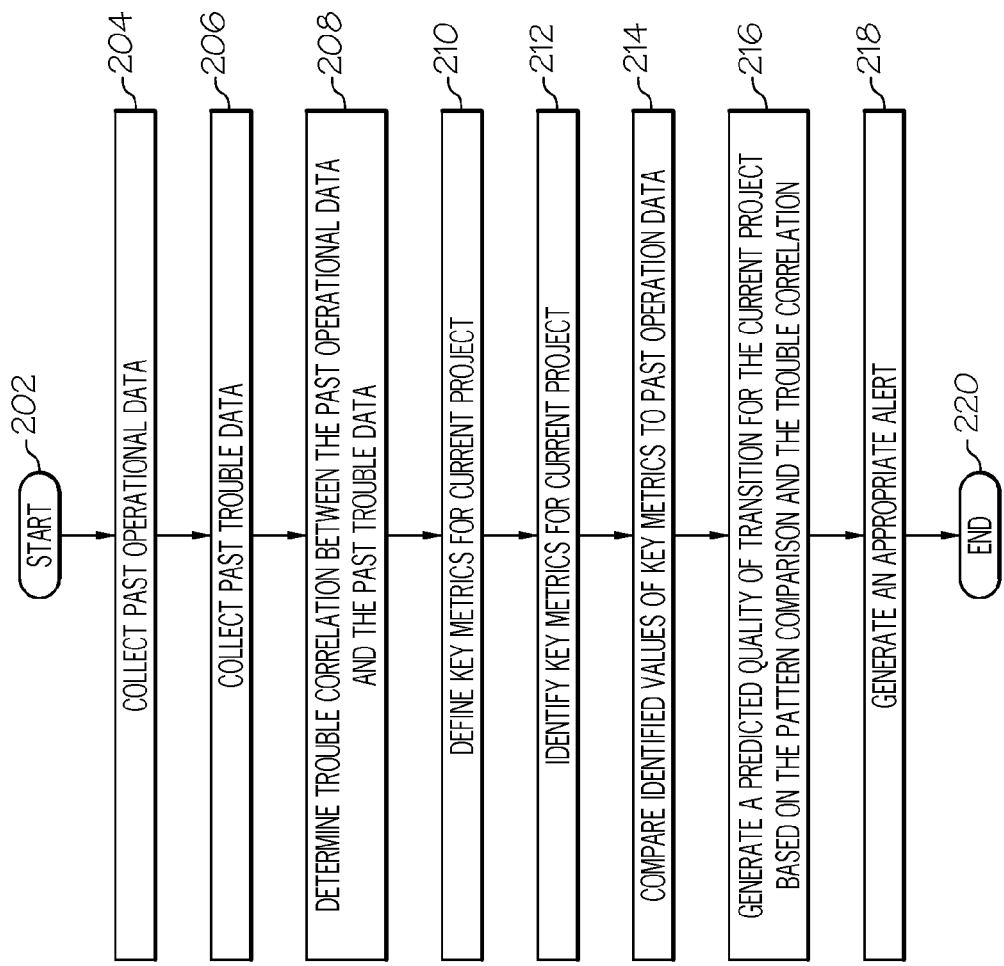
FIG. 2 is a high level flow chart of one or more exemplary steps taken by a processor to predict troubles that may be encountered when transitioning from one phase to the next in a current project.

Referring now to FIG. 2, a high level flow chart of one or more exemplary steps taken by a processor to predict troubles that may be encountered when transitioning from one phase to the next in a current project is presented. After initiator block 202, which may be prompted by a project manager anticipating that a transition phase for a project is about to be entered, past operational data for past healthy projects and past troubled projects before transition phases is collected (block 204). These transition phases take a project from a first phase to a second phase. The operational data is data that describes a pre-transition status of a project, either past or current. Examples of such operational data include, but are not limited to, the revenue and cost of a project up to the transition phase, project size, initial review rating (i.e., as established by the provider of the project), customer review ratings (e.g., from customer questionnaires), etc. As described in block 206, past trouble data is also collected for both past healthy projects (i.e., those that were profitable, led to high customer satisfaction, were successful in fulfilling the needs of the project/customer, etc.) and past troubled projects (those that were not profitable, satisfying, successful, etc.). That is, the past trouble data describes unexpected delays and costs associated with transitioning from the first phase to the second phase of the project, thus resulting in project non-profitability, customer dissatisfaction, project failure, etc.

As described in block 208, a trouble correlation between the past operational data (before the transition phases) and the past trouble data (after the transition phases) is determined. This trouble correlation thus describes the relationship between operational data and overall troubles. For example, one-off projects (single projects with no follow-on projects) may be associated with high levels of trouble during transition phases, while projects that follow an often used protocol/template may be associated with fewer troubles during the transition stages in past projects. Similarly, a correlation may be made between certain customers and frequent transition troubles. Similarly, a correlation may be made between certain types of hardware/software and frequent transition troubles. Similarly, a correlation may be made between certain types of businesses and frequent transition troubles.

Similarly, a correlation may be made between certain locations (e.g., specific call centers) and frequent transition troubles.

As described in block 210, a set of key metrics that describe a current health of a current project before transitioning from a current phase to a future phase of the current project is defined. These key metrics are those that are defined as being strong indicators (i.e., particular customers, hardware/software, industry types, etc.) of likely transition problems. As described in block 212, values of this set of key metrics are identified for the current project. The values of the key metrics for the current project are then compared to the past operational data for the past healthy and troubled projects in order to generate a pattern comparison (block 214). As described in block 216, this pattern comparison provides a historical comparison between the current project and the past projects, such that a predicted quality of transition for the current project's transition from the current phase to the next phase can be generated from the pattern comparison combined with the trouble correlation determined in block 206. In one embodiment, this predicted quality of transition describes a speed, cost, and level of customer satisfaction for transitioning from the current phase to the next phase of the current project.

As described in block 218, an appropriate alert is then generated based on the predicted quality of transition for the current project. This alert may be negative (i.e., warning of a transition problem) or positive (i.e., giving a "green light" to proceed with the transition to the next phase of the current project). The process ends at terminator block 220.

In one embodiment, the current project is for a specific customer. As such, the frequency of how often the pattern comparisons are generated is based on a past profitability history with that specific customer. That is, if a project provider has a long history of successful/profitable projects with a particular customer, then only occasional transition predictions/evaluations are needed. However, if the project provider has a history of unsuccessful/nonprofitable projects with a particular customer, or if there is no history or only a limited history of past projects with this particular customer, then most, if not all, current/future projects will need to be evaluated.

Note that in one embodiment, the transition to the next phase in the current project is from a small-scale pilot program to a large-scale program, such that activities in the small-scale pilot program and the large-scale program overlap. For example, assume that the current project is for a call center. There may be an initial pilot program for a limited time period (e.g., three months). After that three month trial period, a transition may or may not be made to a full-fledged project, which will have an expanded scale of more call operators, more computers, etc. However, the activities/components of the full fledged program are the same as those in the pilot project, although there are more of them in the full fledged program.

In one embodiment, the activities in the current phase and the next phase of the current project are different and independent. For example, the project may be for a long-term project. The initial activities (first phase) may be to evaluate the needs of the customer. The subsequent activities (second phase) may be to install needed equipment, based on the results of the first phase.

In one embodiment, the current project may be a long term maintenance project. Thus, there may be certain activities that overlap between the current and future (post-transition) phases, while other activities may be specific to a particular phase. For example, there may be initial testing of equipment that occurs only during the initial phase, while software patches are installed in all phases of the project.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method of predicting trouble during a transition phase of a current project, the computer implemented method comprising:

a processor determining a trouble correlation between past operational data and past trouble data, wherein the past operational data is associated with past healthy projects and past troubled projects before transition phases that take a project from a first phase to a second phase, wherein a transition of a current project from the first phase to the second phase makes resources, which were not available during the first phase, available to the current project, and wherein the past trouble data is collected for the past healthy projects and the past troubled projects after the transition phases;

defining a set of key metrics that describe a current health of the current project before the current project's transition from the first phase to the second phase, wherein the first phase is a current phase of the current project and the second phase is a future phase of the current project;

the processor identifying values of the set of key metrics for the current project;

the processor comparing identified values of the set of key metrics for the current project to the past operational data for past healthy and troubled projects in order to generate a pattern comparison;

the processor generating a predicted quality of transition for the current project's transition from the current phase to the future phase based on the pattern comparison and the trouble correlation, and further according to;

$$\tilde{h} = \operatorname{argmin}\left\{\sum_{q=}^{Q} \|y^q - h(x^q)\|^2\right\}$$

where $\tilde{h}$ is the predicted quality of transition for the current project's transition from the current phase to the future phase, "arg min" is an argument to minimize the bracketed { } equation, $$\sum_{q=}^{Q}$$

is a sum of all past projects from q to Q for a square ($^2$) of an absolute value ($\| \|$) of $y^q - h(x^q)|$, where $y^q$ is a quality of transition y from the current phase to the future phase in q past projects, and h is a set of parameters x for q past projects ($x^q$); and the processor generating an alert based on the predicted quality of transition for the current project.

2. The computer implemented method of claim 1, wherein the predicted quality of transition describes a speed, cost, and level of customer satisfaction for transitioning from the current phase to the second phase of the current project.

3. The computer implemented method of claim 1, wherein the current project is for a specific customer, the computer implemented method further comprising:

adjusting a frequency of generated pattern comparisons based on a past profitability history with the specific customer.

4. The computer implemented method of claim 1, wherein the transition to the second phase in the current project is from a small-scale pilot program to a large-scale program, wherein the large-scale program is larger than the small-scale pilot program, wherein the small-scale pilot program is designed to operate for a predetermined limited length of time before being replaced by the large-scale program, wherein the large-scale program has more activities than the small-scale pilot program, and wherein activities in the small-scale pilot program and the large-scale program overlap.

5. The computer implemented method of claim 1, wherein the activities in the current phase and the second phase of the current project are different and independent.

6. The computer implemented method of claim 1, wherein the current project is a maintenance project.

7. The computer implemented method of claim 1, wherein the past trouble data describes unexpected delays and costs associated with transitioning from the first phase to the second phase of the project.

8. A computer program product for predicting trouble during a transition phase of a current project, the computer program product comprising:

a non-transitory computer readable storage media;

first program instructions to determine a trouble correlation between past operational data and past trouble data, wherein the past operational data is associated with past healthy projects and past troubled projects before transition phases that take a project from a first phase to a second phase, and wherein the past trouble data is collected for the past healthy projects and the past troubled projects after the transition phases;

second program instructions to define a set of key metrics that describe a current health of a current project before a current project's transition from the first phase to the second phase, wherein the first phase is a current phase of a current project and the second phase is a future phase of the current project;

third program instructions to identify values of the set of key metrics for the current project;

fourth program instructions to compare identified values of the set of key metrics for the current project to the past operational data for past healthy and troubled projects in order to generate a pattern comparison;

fifth program instructions to generate a predicted quality of transition for the current project's transition from the current phase to the future phase based on the pattern comparison and the trouble correlation, and further according to:

$$\tilde{h} = \operatorname{argmin}\left\{\sum_{q=}^{Q} \|y^q - h(x^q)\|^2\right\}$$

where $\tilde{h}$ is the predicted quality of transition for the current project's transition from the current phase to the future phase, "arg min" is an argument to minimize the bracketed { } equation, $$\sum_{q=}^{Q}$$

is a sum of all past projects from q to Q for a square ($^2$) of an absolute value ($\| \|$) of $y^q - h(x^q)$, where $y^q$ is a quality of transition y from the current phase to the future phase in q past projects, and h is a set of parameters x for q past projects ($x^q$);

and wherein the first, second, third, fourth, fifth, and sixth program instructions are stored on the non-transitory computer readable storage media.

9. The computer program product of claim 8, wherein the predicted quality of transition describes a speed, cost, and level of customer satisfaction for transitioning from the current phase to the second phase of the current project.

10. The computer program product of claim 8, wherein the current project is for a specific customer, the computer program product further comprising:
seventh program instructions to adjust a frequency of generated pattern comparisons based on a past profitability history with the specific customer; and wherein the seventh program instructions are stored on the computer readable storage media.

11. The computer program product of claim 8, wherein the transition to the second phase in the current project is from a small-scale pilot program to a large-scale program, wherein the large-scale program is larger than the small-scale pilot program, wherein the small-scale pilot program is designed to operate for a predetermined limited length of time before being replaced by the large-scale program, wherein the large-scale program has more activities than the small-scale pilot program, and wherein activities in the small-scale pilot program and the large-scale program overlap.

12. The computer program product of claim 8, wherein the activities in the current phase and the second phase of the current project are different and independent.

13. The computer program product of claim 8, wherein the past trouble data describes unexpected delays and costs associated with transitioning from the first phase to the second phase of the project.

14. A computer system comprising:
a central processing unit (CPU), a computer readable memory, and a computer readable storage media;
first program instructions to determine a trouble correlation between past operational data and past trouble data, wherein the past operational data is associated with past healthy projects and past troubled projects before transition phases that take a project from a first phase to a second phase, and wherein the past trouble data is collected for the past healthy projects and the past troubled projects after the transition phases;
second program instructions to define a set of key metrics that describe a current health of a current project before a current project's transition from the first phase to the second phase, wherein the first phase is a current phase of a current project and the second phase is a future phase of the current project;
third program instructions to identify values of the set of key metrics for the current project;
fourth program instructions to compare identified values of the set of key metrics for the current project to the past operational data for past healthy and troubled projects in order to generate a pattern comparison;
fifth program instructions to generate a predicted quality of transition for the current project's transition from the current phase to the future phase based on the pattern comparison and the trouble correlation, and further according to:

$$\tilde{h} = \mathrm{argmin}\left\{\sum_{q=}^{Q} \|y^q - h(x^q)\|^2\right\}$$

where $\tilde{h}$ is the predicted quality of transition for the current project's transition from the current phase to the future phase, "arg min" is an argument to minimize the bracketed { } equation, $$\sum_{q=}^{Q}$$

is a sum of all past projects from q to Q for a square ($^2$) of an absolute value ($\| \|$) of $y^q - h(x^q)$, where $y^q$ is a quality of transition y from the current phase to the future phase in q past projects, and h is a set of parameters x for q past projects ($x^q$); and wherein
the first, second, third, fourth, fifth, and sixth program instructions are stored on the computer readable storage media for execution by the CPU via the computer readable memory.

15. The computer system of claim 14, wherein the predicted quality of transition describes a speed, cost, and level of customer satisfaction for transitioning from the current phase to the second phase of the current project.

16. The computer implemented method of claim 1, further comprising:
the processor associating a particular service location with transition troubles for the current project; and
the processor determining the trouble correlation between the past operational data and the past trouble data based on an association of the current project with the particular service location.

17. The computer implemented method of claim 1, further comprising:
the processor associating a particular type of business with transition troubles for the current project; and
the processor determining the trouble correlation between the past operational data and the past trouble data based on an association of the current project with the particular type of business.

18. The computer implemented method of claim 1, further comprising:
the processor associating a particular type of hardware with transition troubles for the current project; and
the processor determining the trouble correlation between the past operational data and the past trouble data based on an association of the current project with the particular type of hardware.

19. The computer implemented method of claim 1, further comprising:
the processor associating a particular customer with transition troubles for the current project; and
the processor determining the trouble correlation between the past operational data and the past trouble data based on an association of the current project with the particular customer.

* * * * *